United States Patent
Yamaguchi et al.

(10) Patent No.: US 6,878,218 B2
(45) Date of Patent: Apr. 12, 2005

(54) HIGH STRENGTH GEAR AND METHOD OF PRODUCING THE SAME

(75) Inventors: Takuro Yamaguchi, Kanagawa (JP); Keizo Otani, Kanagawa (JP); Jun Katoh, Kobe (JP); Toshiki Satou, Kobe (JP); Satoshi Abe, Kobe (JP); Masakazu Ikeda, Kobe (JP)

(73) Assignees: Nissan Motor Co., Ltd., Yokohama (JP); Kabushiki Kaisha Kobe Seiko Sho, Kobe (JP)

(*) Notice: Subject to any disclaimer, the term of this patent is extended or adjusted under 35 U.S.C. 154(b) by 44 days.

(21) Appl. No.: 10/077,806

(22) Filed: Feb. 20, 2002

(65) Prior Publication Data

US 2002/0179188 A1 Dec. 5, 2002

(30) Foreign Application Priority Data

Mar. 23, 2001 (JP) .......................... 2001-086195

(51) Int. Cl.$^7$ ................... F16H 55/17; F16H 55/06
(52) U.S. Cl. ................ 148/319; 148/226; 148/230; 148/231; 148/318
(58) Field of Search ................ 148/319, 318, 148/226, 230, 231

(56) References Cited

U.S. PATENT DOCUMENTS 6,093,263 A * 7/2000 Kobayashi et al. ......... 148/318

FOREIGN PATENT DOCUMENTS

| JP | 05078821 | | 3/1993 |
|----|----------|---|--------|
| JP | 08165557 | * | 6/1996 |
| JP | 10167348 | | 6/1998 |
| JP | 2001073072 | * | 3/2001 |

* cited by examiner

Primary Examiner—Sikyin Ip
(74) Attorney, Agent, or Firm—Foley & Lardner LLP

(57) ABSTRACT

A high strength gear is provided which comprises a base metal of an iron-base alloy, the base metal being carburized or carbonitrided and having a tooth surface, and a coating containing Fe nitride and/or Fe carbonitride, formed on the tooth surface. A method of forming a high strength gear is also provided.

17 Claims, 2 Drawing Sheets

HIGH STRENGTH GEAR AND METHOD OF PRODUCING THE SAME

BACKGROUND OF THE INVENTION

The present invention relates to a high strength gear, particularly of the kind that can be successfully used in a drive train of a high output engine and can attain an improved wear resistance and an elongated life. The present invention further relates to a method of producing such a high strength gear.

Heretofore, carburizing steels or carbonitriding steels are generally used for gears for automotive transmissions. With the tendency that the output of the engine has been becoming higher in these years, damages such as pitting, spalling and wear, to be caused in a tooth surface of a gear has given rise to a problem.

As a countermeasure to this problem, it is considered to coat the tooth surface of the gear with a hard coating. An example of a hard coating formed on a sliding member is disclosed in Japanese Patent Provisional Publication No. 5-78821. Namely, by the publication, it has been proposed a piston ring that is improved in the wear resistance by being coated with a coating formed of a mixed texture of at least one metal selected from the group consisting of Ni, Co and Mo and carbide or nitride of at least one metal selected from the group consisting of Cr, Ti and W.

Further, it is proposed by Japanese Patent Publication No. 10-167348 to coat a gear with a titanium nitride coating for the purpose of improving the pitting resistance.

SUMMARY OF THE INVENTION

However, by the above described related art, it is necessitated to use a large amount of Ni, Co and Mo which are expensive materials in order to attain a sufficient toughness and furthermore a complicated coating operation using a plurality of targets is necessitated for forming a hard coating, thus resulting in a high cost.

Further, as a base metal for a gear is used a steel having a high toughness. In this connection, the composition of the coating disclosed in the above-described publications has a large difference in modulus of elasticity from the base steel of the gear. This causes a problem in that when such coating is formed on a gear that is locally subjected to a high surface pressure, the coating is likely to be separated from the base steel due to a large shearing stress caused therebetween.

Further, in the above described publications, it is necessitated to keep the temperature at which the coating is formed, at least at 300° C. or higher. Such a high temperature causes the base metal to be softened, thus causing the pitting resistance and the bending fatigue strength to be lowered. Accordingly, the base metal needs to be of such a material that is low in the machinability and the toughness so as not be softened at the above described high temperature. Such a material is, for example, tool steel that is costly for gear.

It is accordingly an object of the present invention to provide a high strength gear that has a high strength, whose tooth surface is considerably improved in the pitting resistance, spalling resistance and wear resistance, and that can maintain a desired strength over a long period of usage and can be produced at low cost.

It is a further object of the present invention to provide a method of producing a high strength gear of the foregoing character.

According to an aspect of the present invention, there is provided a high strength gear comprising a base metal of an iron-base alloy, the base metal being carburized or carbonitrided and having a tooth surface, and a coating formed on the tooth surface and containing Fe nitride and/or Fe carbonitride.

According to a further aspect of the present invention, there is provided a method of producing a high strength gear comprising forming a base metal into a predetermined gear shape, carburizing or carbonitriding the base metal of the predetermined gear shape, and forming a coating containing Fe nitride and/or Fe carbonitride on at least a tooth surface of the base metal of the predetermined gear shape.

DESCRIPTION OF THE PRFERRED EMBODIMENT

Figure 1:
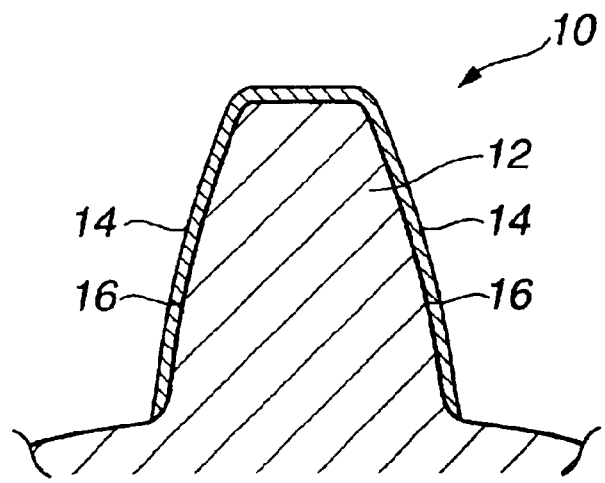
FIG. 1 is a schematic, fragmentary sectional view of a portion of a high strength gear according to an embodiment of the present invention.

Referring first to FIG. 1, a high strength gear according to an embodiment of the present invention is generally indicated by 10 and includes base metal 12 formed into a predetermined gear shape. In the meantime, "%" is herein used to indicate the mass percentage unless otherwise described.

As mentioned above, in high strength gear 10 of the present invention, a Fe-base alloy that is carburized or carbonitrided is used as base metal 12, and Fe nitride and/or Fe carbonitride is used as a coating material. Base metal 12 has meshing surface or tooth surface 16 that is coated with coating 14 that contains Fe nitride and/or Fe carbonitride.

It is needless to say that such coating 14 can consist of Fe nitride and/or Fe carbonitride only.

The above-described coating material has excellent toughness and high hardness. In this embodiment, by constructing gear 10 as described above, the difference in coefficient of thermal expansion and modulus of elasticity between base metal 12 and coating 14 is small. Thus, the shearing stress caused at the interface between base metal 12 and coating 14 at the time of formation of coating 14 or at the time of use of gear 10 is reduced, so that above-described coating 14 is hard to be peeled off and has a good adherence.

Accordingly, the tooth surface of high strength gear 10 of this invention is considerably improved in the pitting, spalling and wear resistance.

In this connection, the above-described coating material is preferably SUS 304 according to JIS represented by JIS G4303 (stainless steel bar) and JIS G4304 (cold rolled stainless steel plate or steel band).

As base metal 12 of gear 10 of the present invention, an iron-based alloy can be used but it is preferable to use carburizing steel for the purpose of attaining an impact resistance and bending fatigue strength necessitated for the gear.

Further, in order to suppress softening of base metal 12 due to high temperature at the time of formation of coating 14, it is desired to use carbonitriding steel. In the meantime, selection of carburizing steel or carbonitriding steel can be made optionally depending upon actual use of gear 10.

In gear 10 of the present invention, a representative composition of the above described iron-based alloy for base metal 12 comprises 0.15 to 0.25% C, 0.4 to 0.9% Si, 0.05 to 0.7% Mn, 1.25 to 2.5% Cr, 0.35 to 1% Mo, 0.02 to 0.06% Al, 0.007 to 0.015% N, and the balance essentially consisting of Fe.

The reason for the above described numerical limitations of the above described composition will be described below.

(a) C: 0.15 to 0.25%

C is an essential element for obtaining an effective hardened depth while allowing the core of carbonitrided gear 10 to have a predetermined hardness. It is preferable that C is contained in gear 10 in the amount of 0.15% or more. However, when the content of C is too much, the toughness, machinability and cold working property of base metal 12 are lowered. Thus, it is preferable to determine the upper limit of the C content to be 0.25%.

In the meantime, the more preferable range of the C content is from 0.17 to 0.22%.

(b) Si: 0.4 to 0.9%

Si is an element that forms carbonitride in a surface layer of gear 10 and thereby greatly contributes to the improvement in the softening resistance of a carbonitride precipitate layer (i.e., carbonitrided surface layer). Further, Si is an element useful for suppressing precipitation of carbonitride at the grain boundaries and for spheroidizing carbonitride and thereby improving the wear resistance. Further, Si acts for hardening of the matrix of the carbonitrided surface layer. For enabling C to exert such actions effectively, Si content is preferably 0.4% or higher. However, when the Si content is too high, formation of the carbonitrided surface layer is inhibited, and the toughness and machinability of base metal 12 are lowered considerably. Thus, it is preferable to determine the upper limit of the Si content to be 0.9%.

In the meantime, the more preferable upper limit of the Si content is 0.8%.

(c) Mn: 0.05 to 0.7%

Mn is an element that forms carbonitride and thereby greatly contributes to the improvement of the carbonitride precipitate layer. Mn also acts as a deoxidation component at the time of manufacture of the above-described iron-based alloy. Further, Mn is effective for improving the hardenability and the machinability by the effect of formation of manganese sulfide (MnS).

For making such effects be produced effectively, the Mn content is preferably at least 0.05% or higher. However, when the Mn content is too high, a bad influence is given to the forgeability and machinability and moreover the amount of retained austenite becomes excessively large for thereby decreasing the surface hardness. Thus, the Mn content is preferably 0.7% or lower.

In the meantime, the more preferable lower limit of the Mn content is 0.2%.

(d) Cr: 1.25 to 2.5%

In order to improve the hardenability of base metal 12 for thereby attaining a stable hardened depth and a necessary core hardness of gear 10 and thereby attaining a necessary static strength and fatigue strength of the gear and furthermore to improve the softening resistance of the matrix of the hardened surface layer at the time of tempering, the Cr content is preferably 1.25% or higher.

However, when the Cr content is too high, a large amount of CrN (chromium nitride) is precipitated at the grain boundaries. This decreases the amount of Cr dissolved in austenite and therefore deteriorates the hardenability, thus decreasing the surface hardness. Further, when the Cr content is too high, the carbonitriding ability is deteriorated and furthermore a bad influence is given to the machinability. Thus, the upper limit of the Cr content is preferably 2.5% or lower.

In the meantime, the more preferable range of the Cr content is from 1.4 to 2.2%.

(e) Mo: 0.35 to 1%

Mo has a quite important action of increasing the amount of N to be introduced into base metal 12 and thereby maintaining the hardenability of a portion surrounding a place where the amount of precipitation of CrN is increased. Further, Mo has an action of accelerating formation of carbonitride and refinement of the same. Namely, the degree of carbonitriding increases with increase of the Mo content. Since the composite carbonitride is hard, Mo acts effectively for making higher the hardness of the carbonitrided layer.

By such actions, Mo contributes to decrease of the abnormal layer such as incompletely hardened texture at the surface of the carbonitrided layer and increase in the strength of the inner part of the carbonitrided layer.

In order to attain such actions effectively, the Mo content is preferably 0.35% or higher. However, too high Mo content deteriorates the toughness and machinability and causes the amount of retained austenite at the surface layer to become too large, thus lowering the surface hardness. Thus, the Mo content is preferably 1% or less.

In the meantime, the more preferable range of the Mo content is from 0.4 to 0.9%.

(f) Si+Mn+Mo: 1 to 2.2%

This requirement is quite important though not shown in the above-described representative composition.

Si, Mn and Mo have the respective actions as described above and any of them acts effectively for increasing the resistance to softening due to tempering at quasi-high temperature range. However, too high content deteriorates the productivity such as toughness, cold rolling ability and machinability.

Namely, it is important that the contents of Si, Mn and Mo are well balanced. In order to attain a good softening resistance that is intended by the present invention, the total content of Si, Mn and Mo is preferably within the range from 1 to 2.2%.

In the meantime, the more preferable total content of Si, Mn and Mo is in the range from 1.2 to 1.8%.

(g) Al: 0.02 to 0.06%

Al is an element that acts as devulcanizing agent and is further effective for forming AlN (aluminium nitride) at the time of heat treatment and refining the grains after hardening. Thus, the Al content is preferably 0.02% or lower.

However, when the Al content is too high, the refined grains are coagulated to cause grain growth. Thus, the Al content is preferably 0.06% or lower.

In the meantime, the more preferable upper limit of the Al content is 0.04%.

(h) N: 0.007 to 0.015%

N has an action that it combines with Al to form AlN and refines the grains. Thus, the N content is preferably 0.007% or higher.

However, the action becomes saturated at the N content of 0.015%. Thus, the upper limit of the N content is preferably 0.015%.

In the meantime, the more preferable N content is in the range from 0.008 to 0.012%.

Then, other features of the high strength gear of the present invention will be described.

The gear of the present invention is produced by forming above-described base metal 12 into a desired gear shape, then carburizing or carbonitriding base metal 12 of the desired gear shape and depositing, by vapor deposition, above-described coating 14 on carbonitrided base metal 12. In this instance, in a surface portion of base metal 12 that is of such a thickness that extends from the outermost surface, to the depth of 0.1 mm, it is preferable that the C content [Cs] is 0.7% or higher and the N content [Ns] is in the range from 0.6 to 2%, and the value R obtained from the following expression (1) is 7.5% or higher.

$$R=1.11\times[Cs]+1.25\times[Ns]+1.89\times(\text{total Si content of gear 10 by \%})+1.22\times(\text{total Mn content of gear 10 by \%})+0.67\times(\text{total Mo content of gear 10 by \%})+3.94 \quad (1)$$

By such characteristics, gear 10 of the present invention features that the resistance to softening of the hardened surface layer at quasi-high temperature is made considerably higher. The reason why such requirements are determined will be described below.

(i) [Cs]: 0.7% or higher and [Ns]: 0.6 to 2%

[Cs] and [Ns] are indicators for indicating the amount of C and N penetrated into the surface layer of gear 10 that is carburized or carbonitrided.

[Cs] is an important factor mainly for attaining the hardness of the hardened surface layer and is preferably 0.7% or higher in order to provide the hardened surface layer with a sufficient hardness.

On the other hand, [Ns] is effective mainly for making higher the softening resistance of the hardened surface layer at quasi-high temperature after hardening. In this respect, Si carbonitride and Fe carbonitride are largely contributive in this embodiment. Thus, by setting [Ns] within this range, Si nitrides that are contributive to the softening resistance are precipitated, the amount of retained austenite after heat treatment becomes a desired value, and the abnormal texture such as an incompletely hardened texture is not caused, thus making it possible to maintain the hardness as desired.

In the meantime, the surface layer in which the above described requirements of [Cs] and [Ns] are met will suffice if it has such a thickness that extends from the outermost surface of gear 10, i.e., the outermost tooth surface to the depth of 0.1 mm. In the surface layer of such a thickness, a high shearing stress is caused at the time of usage of gear 10.

(j) Value R: 7.5 or higher

As mentioned above, the chemical composition of base metal 12, particularly the contents of Si, Mn and Mo and [Cs], [Ns] formed by carburizing or carbonitriding treatment and existing in the hardened surface layer exert a great influence on the precipitation amount of carbonitride and the existing form of the same. By satisfying the predetermined requirements of the present invention, the softening resistance, particularly at quasi-high temperature can be made higher. In this connection, the value R is closely related to the surface hardness after softening. In this respect, in order that such actions are produced assuredly, it is quite important to control so that the value R obtained by the expression (1) is 7.5% or higher.

In the meantime, as will be apparent from the expression (1), the value R is influenced by [Cs], [Ns] and the contents of Si, Mn, and Mo existing in the hardened surface layer and above all is influenced largely by the Si content. This is a large feature of the gear that is recommended by the present invention (i.e., a large feature of the composition of the gear material of the present invention).

Further, in gear 10 of the present invention, it is preferable to control so that the granular iron-based substance existing in the tooth surface of gear 10 coated with above-described coating 14 is 20% or lower by area coefficient.

In this connection, term "surface ratio" is an average surface ratio and indicates the ratio of the area occupied by the granular iron-based material to the area of the entire surface of the gear.

By determining so that the surface ratio is within the above-described range, both of the peel strength at the tooth surface and the bending fatigue/impact strength (strength against breakage) at the root of gear 10 can be attained.

Then, the method of producing high strength gear 10 will be described.

As described above, by the production method of the present invention, high strength gear 10 is produced by forming above described base metal 12 into a desired gear shape, then carburizing or carbonitriding base metal 12 of the desired gear shape, and depositing, by vapor deposition, coating 14 containing Fe nitride and/or Fe carbonitride on at least tooth surface 16 of base metal 12.

In this connection, as the above-described vapor deposition process can be enumerated physical deposition in the presence of of nitrogen and/or methane, and particularly an arc ion plating process (hereinafter will be referred to as AIP process) can be used preferably from the point of view of coating formation speed, reactivity, and adhering quality.

Since suitable formation of coating 14 is attained by carrying out the AIP process in an inactive or reducing atmosphere, it is preferable to carry out the AIP process in an atmosphere of nitrogen and/or methane.

Further, gear 10 of the present invention has excellent toughness and adherence. Thus, even when the AIP process is carried out at a relatively low treatment temperature, i.e., at 300° C. or lower and with bias voltage of 50 volts or lower, toughness and adherence that are sufficiently large for actual use can be attained.

In the meantime, in formation of coating 14 by the AIP process, a granular iron-based substance that is usually called "droplets" is formed on the target, i.e., on the surface of an article (the surface of the gear, particularly the tooth surface in this embodiment).

Generally, if the article on which a number of droplets are present is used, the droplets are dropped off in an early stage of usage to form holes that become defects and considerably shorten the life of the article. Thus, the droplets are all removed by finishing prior to usage.

However, in the present invention, the roughness (Ra) of the tooth surface of gear 10 is determined so as to be 0.25 $\mu$m or lower. By this, even if a small amount of droplets remains on the tooth surface, the pitting resistance is not lowered but an elongated pitting-resistant life can be attained.

Such a phenomenon results from the fact that the droplets polish the mating surface so that the surface roughness becomes smaller in an early stage of usage of the gear of this invention, i.e., "grinding or breaking-in effect" is obtained and therefore generation of heat at the tooth surfaces of a pair of gears is suppressed.

In the present invention, in order to suppress increase of the cost due to a finishing process (additional machining) more than the necessity, it is determined that the surface roughness (Ra) of the tooth surface is preferably 0.25 $\mu$m or lower. In the meantime, the surface roughness Ra is determined in accordance with JIS B0601.

Further, as the surface roughness of tooth surface 16 of base metal 12 prior to formation of coating 14 becomes smaller, the tooth surfaces of gear 10 of the present invention and the mating gear after the above described grinding or breaking-in become smoother. Thus, it is preferable to carry out the coating step by the above-described AIP process after the surface roughness (Ra) of tooth surface 16 of base metal 12 (i.e., gear-shaped base metal 12 made of an iron-based alloy and carburized or carbonitrided) is made to fall in the range of 0.25 $\mu$m or lower.

Similarly, it is more preferable that the surface roughness (Ra) of the tooth surface of gear 10 is made to fall in the range of 0.25 μm or lower after the above-described formation of coating 14.

EXAMPLE

Hereinafter, the present invention will be described further with reference to examples of the present invention and comparative examples.

Figure 2:
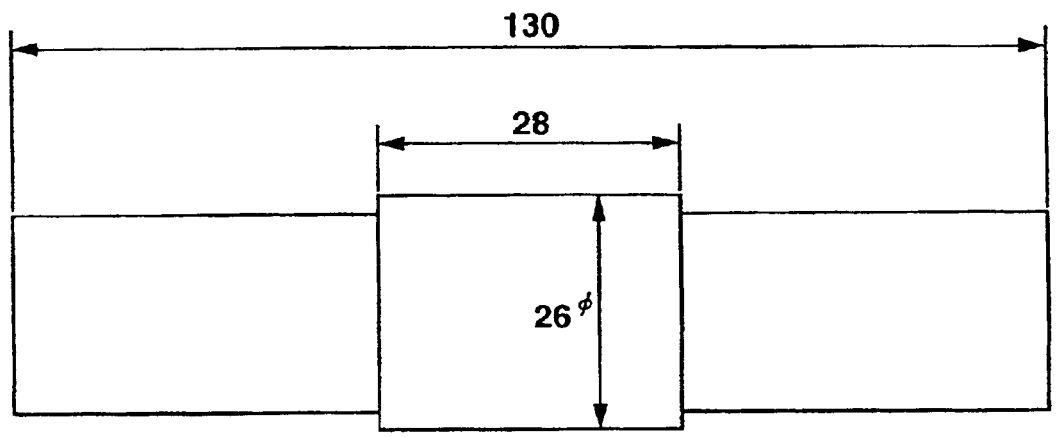
FIG. 2 is a side elevation of a test piece used in a roller pitting test for evaluating the pitting resistance.

As the base metals for the examples of the present invention and for the comparative examples are used steels "a" to "r" shown in Table 1, i.e., steels that satisfy the representative steel composition of the base metal of the present invention and steels that do not. Steels "a" to "r" are normalized, then machined and formed into the pitting test piece shape shown in FIG. 2 and thereafter carburized or carbonitrided.

In the meantime, [Cs] and [Ns] after carbonitriding is an average of the results of analysis of chips collected from a layer of the thickness extending from the outermost surface to the depth in the range from 0.05 to 0.15 mm.

As a scale for indicating the machinability of those materials is used the hardness after normalizing and as a scale for indicating the softening resistance of the base metal at the time of coating is used the hardness after the base metal is held for three hours within the atmosphere of 300° C. In either of the cases, the micro Vickers hardness was used to examine the hardness at the depth of 0.1 mm from the outermost surface.

Figure 3A:
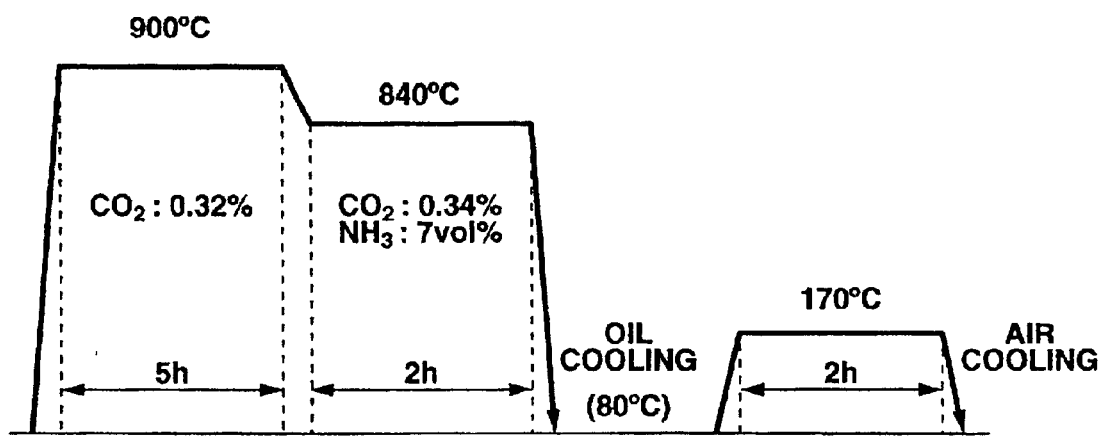
FIGS. 3A and 3B are diagrams showing patterns of heat treatment of a base metal for the high strength gear of the present invention.
Figure 3B:
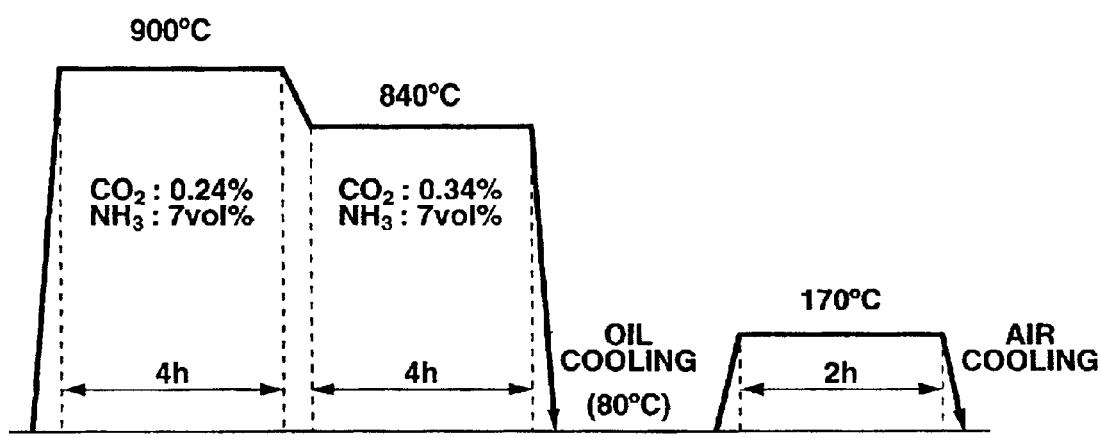

For the roller pitting test, steel "a" that satisfies the composition ranges of the present invention was selected from the above described steels and used. Finishing of the 26° portion of the test piece was carried out after the carbonitriding shown in FIG. 3B. Then, under the following conditions, coatings were formed by using nitride of SUS 304 according to JIS as the coating material of the present invention and TiN and CrN as coating materials for comparative examples. Thereafter, barrel tumbling was performed to adjust the surface roughness. Then, before and after the roller pitting test, the surface roughness Ra at the contact portion of the test piece was examined. Further, after the test, the test piece was cut and the hardness of the base metal at the depth of 1 mm from the coating was examined by micro-Vickers hardness.

Coating Conditions by Arc-Ion Plating (I) Coating conditions of the embodiment of the present invention
  Degree of vacuum before introduction of gas:
    $1.33 \times 10^{-1}$ to $6.66 \times 10^{-3}$ Pa
    ($1 \times 10^{-3}$ to $5 \times 10^{-5}$ Torr)
  Sputter cleaning:
    Argon (Ar), −600 to −700V, 4 min (intermittent)
  Pressure after introduction of gas:
    Nitrogen ($N_2$) 1.33 to 5.32 Pa
    (10 to 40 mTorr)
  Cathode current at the time of coating:
    60 to 100 A
  Bias voltage at the time of coating:
    30V
  Temperature before coating:
    100 to 150° C.
  Coating pattern:
    cycle of coating for 10 minutes and suspension of coating for 50 minutes
(II) Coating conditions of comparative example
  Degree of vacuum before introduction of gas:
    $1.33 \times 10^{-1}$ to $6.66 \times 10^{-3}$ Pa
    ($1 \times 10^{-3}$ to $5 \times 10^{-5}$ Torr)
  Sputter cleaning:
    Argon (Ar), −600 to −700V, 4 min (intermittent)
  Pressure after introduction of gas:
    Nitrogen ($N_2$) 1.33 to 5.32 Pa
    (10 to 40 mTorr)
  Cathode current upon coating:
    100 to 150 A
  Bias voltage upon coating:
    70V
  Temperature before coating:
    250 to 300° C.
  Coating pattern:
    cycle of coating for 10 minutes and suspension of coating for 50 minutes Roller Pitting Test Conditions
  Surface pressure:
    3 Gpa
  Rotational speed:
    1500 rpm
  Slip ratio:
    60%
  Oil temperature:
    90° C.
  Oil:
    Nissan genuine belt fluid NS-1
  Oil supply amount:
    2 L/min
  Mating roller:
    roller made of SCM435 according to JIS and carburized In Table 1, the hardness of steels "a" to "r" after normalizing is shown in addition. A large difference in hardness is not found in steels "a" to "l" of the examples of the present invention. In steels "j", "m" and "p" wherein the contents of Si, Mn and Mo are large, [Si+Mn+Mo] is high and further the hardness after normalizing is high. Similarly, in steel "n" wherein the Cr content is large, the hardness is high.

Table 2 shows [Cs] and [Ns] after carbonitriding, value R and hardness after example is held in an atmosphere of 300° C. for three hours.

In sample Nos. 10 and 28 made of steel "j" of a large Si content and sample Nos. 14 and 32 made of steel "n" of a large Cr content, the carbonitriding property is deteriorated, and [Cs] and [Ns] do not satisfy the requirement of the present invention.

Further, in sample Nos. 19 to 27 that satisfy the requirements of the present invention, the hardness of any of the samples is Hv 760 or higher. In contrast to this, in sample Nos. 10 to 18 and 28 to 36 whose compositions are not suitable and sample Nos. 1 to 9 wherein [Ns] is low and the value R does not satisfy the requirement of the invention, the hardness of any of the samples is less than Hv 750.

Table 3 shows the result of examination of roller pitting test pieces with respect to the roughness before and after test, hardness of base metal after test, and peel life. The peel life is represented by the number of rotation of the test piece at which peel or breakage is caused in the roller pitting test. In test piece Nos. 37 and 38 that are examples of the present invention, peel or breakage was not caused when the number of rotation was $2.0 \times 10^7$. In contrast to this, in test piece Nos. 43 to 46 that were different in composition of coating from that of the present invention, coating was lost, i.e., peel was caused at an early stage of the test due to lack of toughness and adherence of the coating.

Further, in the test piece No. 38 that satisfies the requirements of the present invention, peel was not caused though there remained a small amount of droplets. In contrast to this, in test piece No. 39 in which there remained a large amount of droplets to deteriorate the surface roughness, peel was caused at an early stage of the test.

Further, in test piece Nos. 37 and 38 in which coating was performed under the condition satisfying the requirements of the present invention, the hardness of the base metal after the test was Hv 770 or higher. In contrast to this, in case of test piece Nos. 40 to 42, 44 and 46 in which coating was performed at high temperature, the hardness of the base metal was lowered, i.e., Hv 730 or lower.

From the foregoing, it will be understood that according to the present invention a gear made of iron-based alloy has a tooth surface coated with a predetermined coating and therefore has a high strength, particularly the gear is considerably improved in the pitting resistance, spalling resistance and wear resistance of the tooth surface and therefore can retain a suitable strength over a long period of usage. Further, the gear of the present invention can be produced at low cost.

The entire contents of Japanese Patent Application No. 2001-086195 are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

TABLE 2

| | | Sample No. | Kind of Steel | Carburizing Condition | [Cs] (mass %) | [Ns] (mass %) | Value R | Hardness After Tempering (Hv) |
|---|---|---|---|---|---|---|---|---|
| Comparative Example | | 1 | a | (A) | 0.75 | 0.51 | 7.22 | 718 |
| | | 2 | b | | 0.74 | 0.52 | 7.40 | 723 |
| | | 3 | c | | 0.74 | 0.51 | 7.35 | 743 |
| | | 4 | d | | 0.81 | 0.55 | 7.28 | 738 |
| | | 5 | e | | 0.85 | 0.50 | 7.18 | 742 |
| | | 6 | f | | 0.74 | 0.52 | 7.26 | 741 |
| | | 7 | g | | 0.75 | 0.51 | 7.23 | 716 |
| | | 8 | h | | 0.75 | 0.52 | 7.22 | 728 |
| | | 9 | i | | 0.76 | 0.51 | 7.23 | 720 |
| | | 10 | j | | 0.28 | 0.17 | 8.05 | 638 |
| | | 11 | k | | 0.75 | 0.53 | 6.91 | 677 |
| | | 12 | l | | 0.76 | 0.54 | 6.61 | 648 |
| | | 13 | m | | 0.75 | 0.50 | 8.27 | 671 |
| | | 14 | n | | 0.55 | 0.29 | 6.60 | 631 |
| | | 15 | o | | 0.72 | 0.54 | 7.06 | 710 |
| | | 16 | p | | 0.73 | 0.55 | 7.85 | 681 |
| | | 17 | q | | 0.76 | 0.54 | 7.02 | 711 |
| | | 18 | r | | 0.70 | 0.55 | 6.82 | 702 |
| Example of This Invention | | 19 | a | (B) | 0.76 | 0.76 | 7.54 | 765 |
| | | 20 | b | | 0.75 | 0.78 | 7.74 | 775 |
| | | 21 | c | | 0.73 | 0.78 | 7.68 | 782 |
| | | 22 | d | | 0.80 | 0.79 | 7.56 | 785 |
| | | 23 | e | | 0.83 | 0.62 | 7.56 | 796 |
| | | 24 | f | | 0.77 | 0.79 | 7.63 | 814 |
| | | 25 | g | | 0.75 | 0.76 | 7.54 | 769 |
| | | 26 | h | | 0.76 | 0.77 | 7.54 | 772 |
| | | 27 | i | | 0.76 | 0.76 | 7.54 | 768 |
| Comparative Example | | 28 | j | (B) | 0.31 | 0.19 | 8.11 | 649 |
| | | 29 | k | | 0.76 | 0.73 | 7.17 | 703 |
| | | 30 | l | | 0.75 | 0.67 | 6.76 | 684 |
| | | 31 | m | | 0.77 | 0.80 | 8.67 | 705 |
| | | 32 | n | | 0.61 | 0.33 | 6.71 | 644 |
| | | 33 | o | | 0.75 | 0.70 | 7.29 | 736 |
| | | 34 | p | | 0.76 | 0.79 | 8.18 | 715 |
| | | 35 | q | | 0.74 | 0.72 | 7.22 | 722 |
| | | 36 | r | | 0.74 | 0.68 | 7.02 | 710 |

TABLE 1

| | Kind of Steel | Chemical Composition (mass %) | | | | | | | Si + Mn + Mo | Hardness (Hv) after Normalizing |
|---|---|---|---|---|---|---|---|---|---|---|---|
| | | C | Si | Mn | Cr | Mo | Al | N | Others | | |
| Invention | a | 0.17 | 0.45 | 0.54 | 1.45 | 0.45 | 0.029 | 0.010 | | 1.44 | 170 |
| | b | 0.18 | 0.70 | 0.30 | 1.45 | 0.45 | 0.028 | 0.010 | | 1.45 | 174 |
| | c | 0.19 | 0.46 | 0.64 | 1.46 | 0.45 | 0.038 | 0.010 | | 1.55 | 178 |
| | d | 0.19 | 0.42 | 0.53 | 1.79 | 0.46 | 0.033 | 0.009 | | 1.41 | 175 |
| | e | 0.17 | 0.45 | 0.43 | 2.15 | 0.44 | 0.032 | 0.009 | | 1.32 | 179 |
| | f | 0.19 | 0.44 | 0.42 | 1.45 | 0.75 | 0.029 | 0.010 | | 1.61 | 176 |
| | g | 0.17 | 0.46 | 0.55 | 1.45 | 0.42 | 0.029 | 0.011 | Nb: 0.05 | 1.43 | 170 |
| | h | 0.19 | 0.44 | 0.55 | 1.47 | 0.44 | 0.031 | 0.010 | Sb: 0.05 | 1.43 | 170 |
| | i | 0.19 | 0.45 | 0.54 | 1.45 | 0.44 | 0.031 | 0.009 | Cu: 0.42, Ni: 0.41 | 1.43 | 169 |

TABLE 1-continued

| | Kind of Steel | Chemical Composition (mass %) | | | | | | | Si + Mn + Mo | Hardness (Hv) after Normalizing |
|---|---|---|---|---|---|---|---|---|---|---|
| | | C | Si | Mn | Cr | Mo | Al | N | Others | | |
| Comparative Example | j | 0.18 | 1.51 | 0.40 | 1.47 | 0.37 | 0.030 | 0.010 | | 2.28 | 239 |
| | k | 0.20 | 0.30 | 0.55 | 1.45 | 0.35 | 0.031 | 0.009 | | 1.20 | 169 |
| | l | 0.19 | 0.07 | 0.64 | 1.45 | 0.36 | 0.032 | 0.010 | | 1.07 | 168 |
| | m | 0.19 | 0.46 | 1.45 | 1.46 | 0.35 | 0.032 | 0.009 | | 2.26 | 242 |
| | n | 0.20 | 0.44 | 0.50 | 2.70 | 0.36 | 0.032 | 0.011 | | 1.30 | 244 |
| | o | 0.20 | 0.44 | 0.55 | 1.44 | 0.21 | 0.032 | 0.011 | | 1.20 | 165 |
| | p | 0.21 | 0.45 | 0.54 | 1.44 | 1.35 | 0.031 | 0.011 | | 2.34 | 251 |
| | q | 0.19 | 0.25 | 0.77 | 1.10 | 0.22 | 0.029 | 0.010 | | 1.24 | 174 |
| | r | 0.19 | 0.24 | 0.78 | 1.05 | 0.01 | 0.028 | 0.009 | | 1.03 | 166 |

TABLE 3

| | Test Piece No. | Material of Coating | Coating Formation Condition | Surface Roughness Ra(m) before Test | Surface Roughness Ra(m) after Test | Hardness (Hv) of Base Metal after Test | Peel Life (Number of Rotation) |
|---|---|---|---|---|---|---|---|
| Invention | 37 | SUS304 | I | 0.10 | 0.17 | 781 | No Peel at $2.0 \times 10^7$ |
| | 38 | Nitride | I | 0.23 | 0.08 | 776 | No Peel at $2.0 \times 10^7$ |
| Comparative Example | 39 | SUS304 | I | 0.39 | 0.51 | 790 | $8.1 \times 10^6$ |
| | 40 | Nitride | II | 0.11 | 0.10 | 705 | No Peel at $2.0 \times 10^7$ |
| | 41 | | II | 0.21 | 0.11 | 716 | No Peel at $2.0 \times 10^7$ |
| | 42 | | II | 0.45 | 0.30 | 718 | $1.5 \times 10^6$ |
| | 43 | TiN | I | 0.25 | 0.43 | 773 | $5.2 \times 10^4$ |
| | 44 | | II | 0.24 | 0.33 | 705 | $1.2 \times 10^5$ |
| | 45 | CrN | I | 0.22 | 0.31 | 786 | $6.5 \times 10^6$ |
| | 46 | | II | 0.26 | 0.41 | 724 | $1.8 \times 10^7$ |

What is claimed is:

1. A high strength gear comprising:
   a base metal of an iron-base alloy;
   the base metal being subjected to one of carburizing and carbonitriding and having a tooth surface; and
   a coating formed by vapor deposition on the tooth surface and containing at least one of Fe nitride and Fe carbonitride;
   wherein the coating comprises a stainless steel nitride or carbonitride on a surface of the base metal subjected to one of carburizing and carbonitriding.

2. A high strength gear according to claim 1, wherein the base metal is a steel comprising, in mass percentages, 0.15 to 0.25% C, 0.4 to 0.9% Si, 0.05 to 0.7% Mn, 1.25 to 2.5% Cr, 0.35 to 1% Mo, 0.02 to 0.06% Al, 0.007 to 0.015% N, and the balance consisting essentially of Fe.

3. A high strength gear according to claim 2, wherein the total content of Si, Mn and Mo is in the range from 1 to 2.2%.

4. A high strength gear according to claim 1, wherein the C content [Cs] and the N content [Ns] of a surface portion of the base metal extending from an outermost surface to a depth of 0.1 mm after one of the carburizing and the carbonitriding, are 0.7% or higher and 0.6 to 2%, respectively, and a value R obtained from the following expression is 7.5% or higher, $$R=1.11\times[Cs]+1.25\times[Ns]+1.89\times(\text{total Si content of the gear})+1.22\times(\text{total Mn content of the gear})+0.67\times(\text{total Mo content of the gear})+3.94.$$

5. A high strength gear according to claim 1, wherein the coating has at a surface thereof granular iron-based substances that are 20% or lower by area ratio.

6. A method of producing a high strength gear comprising:
   forming a base metal of an iron-base alloy into a predetermined gear shape;
   subjecting the base metal of the predetermined gear shape to one of carburizing and carbonitriding; and
   forming a coating containing at least one of Fe nitride and Fe carbonitride by vapor deposition on at least a tooth surface of the base metal of the predetermined gear shape;
   wherein the coating comprises a stainless steel nitride or carbonitride formed on a surface of the base metal subjected to one of carburizing and carbonitriding.

7. A method according to claim 6, wherein the forming of the coating is performed by an ion plating process, in the presence of nitrogen or methane or nitrogen and methane, with bias voltage of 50 volts or lower, and at the temperature of 300° C. or lower during the forming of the coating.

8. A method according to claim 6, wherein after the subjecting, the tooth surface is finished so that a surface roughness (Ra) of the tooth surface is 0.25 μm or lower and thereafter the forming of the coating is performed.

9. A method according to claim 6, wherein the coating is finished so that a surface roughness (Ra) of the coating is 0.25 μm or lower.

10. A high strength gear according to claim 1, wherein the coating is formed on a surface of the base metal subjected to carburizing.

11. A high strength gear according to claim 10, wherein the coating comprises the Fe carbonitride.

12. A high strength gear according to claim 10, wherein the base metal comprises a hardened carburized surface portion comprising carbon below the coating.

13. A high strength gear according to claim 10, wherein the coating comprises the Fe nitride.

14. A high strength gear according to claim 1, wherein the coating is formed on a surface of the base metal subjected to carbonitriding.

15. A high strength gear according to claim 14, wherein the coating comprises the Fe carbonitride.

16. A high strength gear according to claim 14, wherein the base metal comprises a hardened carbonitrided surface region comprising carbon and nitrogen below the coating.

17. A high strength gear according to claim 14, wherein the coating comprises the Fe nitride.

* * * * *